(No Model.) 2 Sheets—Sheet 2.
C. PREVET.
FILTERING APPARATUS.
No. 598,007. Patented Jan. 25, 1898.
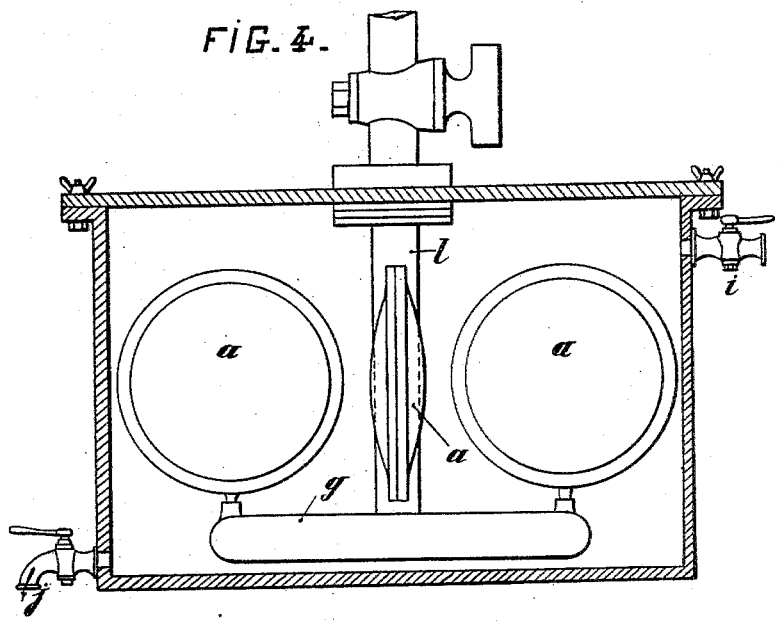
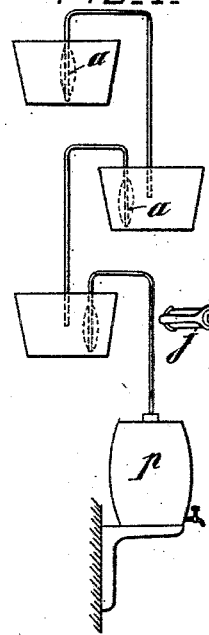
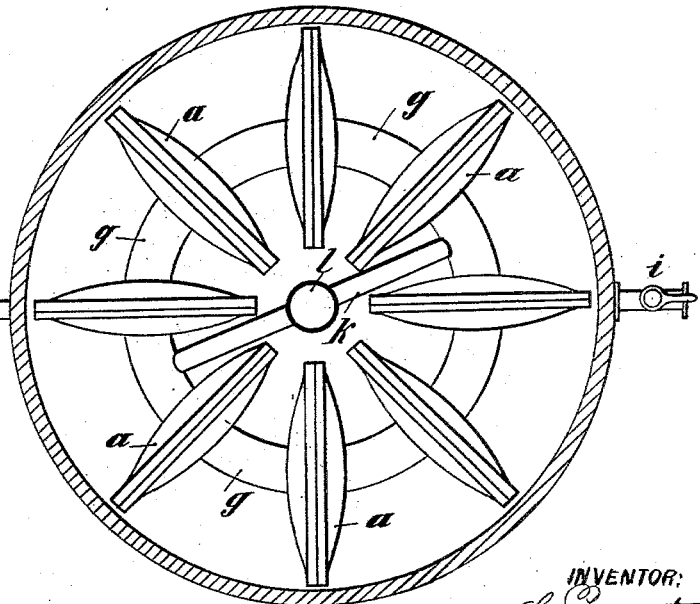
WITNESSES.
INVENTOR:
C. Prevet
BY
ATTORNEYS.

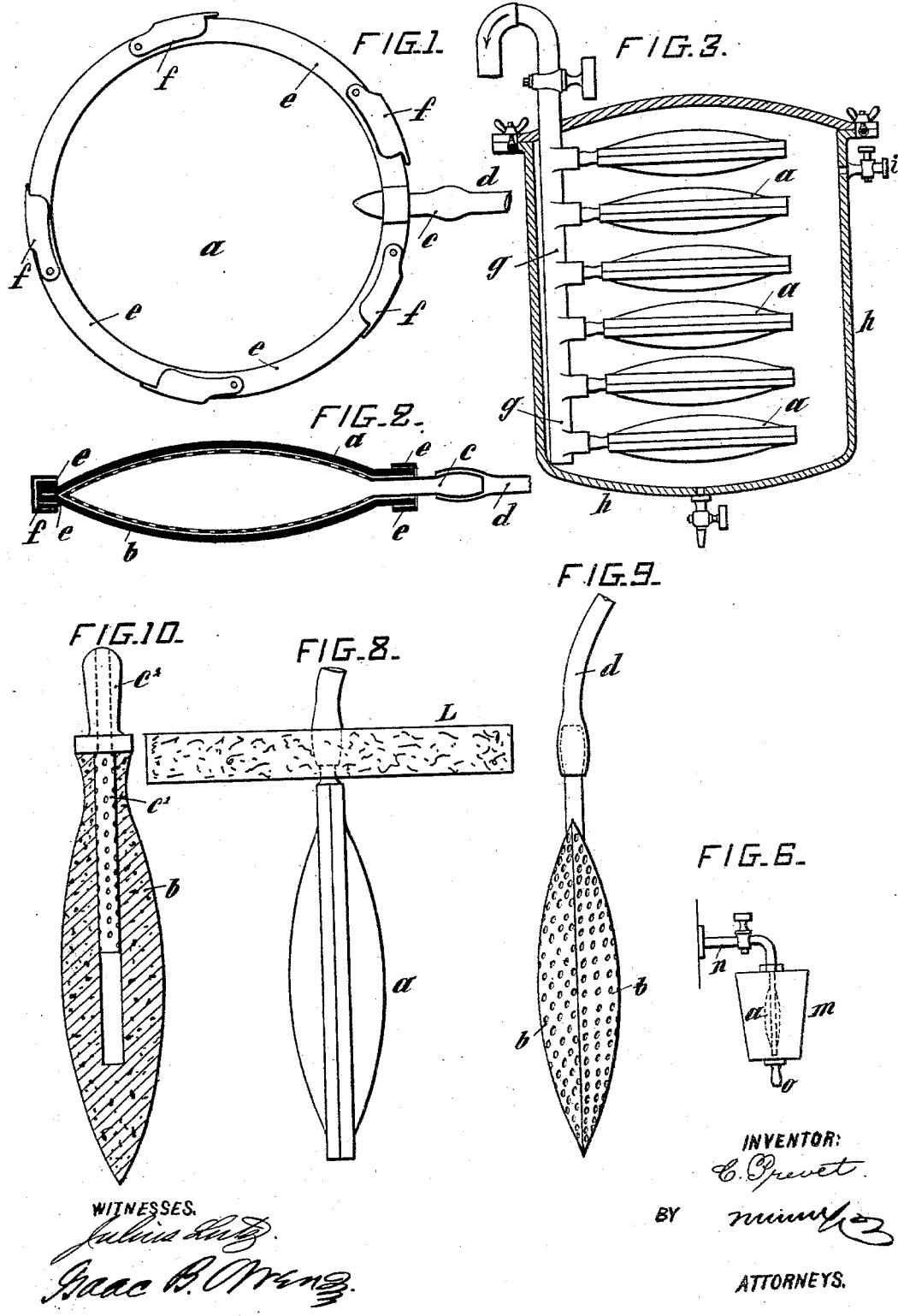

UNITED STATES PATENT OFFICE.

CHARLES PREVET, OF PARIS, FRANCE.

FILTERING APPARATUS.

SPECIFICATION forming part of Letters Patent No. 598,007, dated January 25, 1898.

Application filed January 29, 1897. Serial No. 621,142. (No model.) Patented in Belgium November 9, 1896, No. 124,492.

*To all whom it may concern:*

Be it known that I, CHARLES PREVET, of the city of Paris, France, have invented Improvements in and Relating to Filtering Apparatus, (for which I have obtained Letters Patent in Belgium for fifteen years, dated November 9, 1896, No. 124,492,) of which the following is a full, clear, and exact description.

This invention relates to so-called "economic filters;" and it consists of an improved filtering arrangement of this class characterized by a peculiar combination of the parts of which it is composed.

The novel filtering arrangement will be best understood by the perusal of the following description, with reference to the accompanying drawings, in which—

Figure 1 is an elevation of my improved filter. Fig. 2 is a section of the same according to its diameter. Fig. 3 shows in vertical section several elements of my improved filter arranged horizontally in a cylindrical receptacle. Fig. 4 shows in section several elements of my improved filter arranged vertically around a ring. Fig. 5 shows in plan the above arrangement. Fig. 6 shows an element of my filter applied to a discharge-tap. Fig. 7 shows elements of my filter arranged so as to form a cascade. Fig. 8 represents my improved filter provided with a cork plate, forming a float. Fig. 9 shows apart the metal lens-shaped receptacle placed within the filter. Fig. 10 shows in section the arrangement of a receptacle made of carbon.

Same letters of reference denote like parts in all the figures.

The filter proper, which is adapted for filtering inward from without, consists, as shown in Figs. 1 and 2, of two shells $a$, of unsized filtering-paper cut out to the required shape and preferably stamped. Preferably the paper employed for the purpose is covered with canvas, so that the outer surface of the shells is protected from any abrasion, while the paper is prevented from becoming loose as a result of a shrinkage caused by its being immersed in water, or each shell $a$ may be formed of a number of superposed sheets, the number of which may vary according to the pressure to be sustained, by which means there will be brought about a number of successive filtering operations or stages, each filtering part being perfectly homogeneous. In this arrangement the shells are obtained by the superposition of a number of layers of ordinary paper cut out to the desired shape all at one stroke, stamped or otherwise shaped, and unprovided with any sizing.

Between the two shells of filtering material there is interposed a lens-shaped piece $b$, forming a chamber for the reception of the filtered fluid. This lens-shaped piece may be made of metal and perforated, (see Figs. 2 and 9,) in which case it should be fitted with a jet or branch tube $c$, to which may be fitted in its turn an india-rubber pipe $d$, of any convenient length, or the lens-shaped piece $b$ may be constructed of some porous material, such as stoneware, or preferably carbon, as shown in Fig. 10. In this case the lens-shaped piece is provided with an inner recess, which is adapted to receive a perforated tube $c'$, terminating in a nozzle or connecting-tube $c^2$. The tube does not extend down to the bottom of the said recess, but leaves a free space or empty chamber for the filtered fluid to collect in, so that it may subsequently be discharged through the aforesaid tube $c'$.

The fluid passing through the carbon filter has already been filtered through the paper, and inasmuch as the shells or the several sheets of which they are made up may be changed at will it follows that the carbon is in no case liable to contamination and retains its clarifying properties unimpaired.

The filtering-shells and the internal receptacle are joined together by means of two separate flat rings $e$ and by closing devices, such as the clasps $f$, adapted to retain all parts in position. The perfect tightness of the joint is insured by the action of moisture, which causes the edges of the filtering material to swell and thus to be tightly compressed within the metal rings $e$.

The filter thus constructed forms a perfect portable or pocket filter, suitable for troopers, sportsmen, tourists, explorers, and the like. It may, for this purpose, be provided with a cork plate L, forming a float and enabling it to be maintained above the mud or weeds met with in water-courses or marshes.

These filtering-shells might, however, be made of any suitable material other than paper, for inasmuch as the invention herein described only relates to the combination and arrangement of the parts of the improved filter any really effective filtering material may be employed in the construction of the same without departing from the principle of the invention.

If desired, the shells of the filter may be covered with or inclosed in a wire-gauze or perforated, stamped, or other sheet-metal casing. The interior of the lens-shaped receptacle $b$ may be lined with granulated carbon, so as to clarify more particularly "chromated water." Besides, in some cases there may be inserted into the thickness of the shells a sheet of carbon-paper inclosed between two sheets of white paper.

The arrangement just described constitutes one of the filtering cells or "elements," by connecting which in various ways into groups or series a filtering plant for filtering on a large scale is obtained.

I have shown in Figs. 3 to 7 of the drawings different ways of grouping the elements. In Fig. 3 a number of superposed elements may branch off from a vertical collector $g$ inside a cylindrical receiver $h$, filled with water to be filtered. This receiver is provided with a water-inlet pipe $i$ and a discharge-pipe $j$. In the arrangement shown in Figs. 4 and 5 the cells may be mounted vertically upon an annular collector $g$, fitted with a transverse tube $k$, whereon is mounted the filtered-water-discharge pipe $l$. This arrangement comprises a pipe $i$ for the admission of water into the receiver and another pipe $j$ for the discharge of such water. In another arrangement (shown in Fig. 6) a cell or element is erected vertically in a receiver $m$, which is secured to a discharge-tap $n$. This apparatus receives the fluid to be filtered from the discharge-tap, while the filtered fluid is discharged through a nozzle or spout $s$, located at the bottom of the said receiver. In Fig. 7 I have shown several elements disposed so as to form a cascade in receptacles $p$, correspondingly arranged. The object of this arrangement is to obtain a series of successive filtering stages before the liquid, which is thus filtered several times over, is eventually received in the collecting vessel $p$, which may be a cask, barrel, or the like. It will readily be understood that such an arrangement as this will in the end yield perfectly pure water, and it will further be understood that the details of construction, materials, dimensions, and methods of arrangement of the cells or elements in sets may vary without in any way affecting the principle of the invention.

I claim—

1. A filter, comprising a lens-shaped chambered disk of carbon, and unsized paper secured upon opposite sides of the said disk, substantially as described.

2. In a filter, a core consisting of a lens-shaped disk of carbon having a longitudinal central recess, and a perforated tube extending into the recess and terminating short of the bottom thereof, substantially as described.

3. The combination with a receiver, of a ring-shaped collector in the bottom of the receiver and having a central discharge-pipe leading out through the receiver, and a plurality of filtering-cells secured to said collector, substantially as described.

4. The combination with a receiver, of a ring-shaped collector arranged in the bottom of the receiver and provided with a central discharge-pipe leading out through the receiver, and a plurality of filtering-cells secured to the said collector, said cells each consisting of a lens-shaped perforated core, and unsized paper on opposite sides thereof, substantially as described.

The foregoing specification of my "Improvements in and relating to filtering apparatus" signed by me this 13th day of January, 1897.

CHARLES PREVET.

Witnesses:
 EDWARD P. MACLEAN,
 MAURICE PIGNET.